Oct. 3, 1939.  H. R. McCLEARY  2,174,924

PROCESS FOR PRESERVING FOWL CARCASSES, AND THE ARTICLE PRODUCED

Filed July 23, 1938

INVENTOR
HARRY R. McCLEARY
BY John M. Leach
ATTORNEY

Patented Oct. 3, 1939

2,174,924

UNITED STATES PATENT OFFICE 2,174,924

PROCESS FOR PRESERVING FOWL CARCASSES, AND THE ARTICLE PRODUCED

Harry R. McCleary, St. Louis, Mo., assignor to Sylvania Industrial Corporation, Fredericksburg, Va., a corporation of Virginia Application July 23, 1938, Serial No. 220,847

6 Claims. (Cl. 99—174)

The invention relates to the preserving of fowl carcasses and in particular to a method for preserving fowl carcasses by freezing and the package so produced, and to correlated improvements designed to enhance the preservation of fowl carcasses.

The preservation of fowl carcasses by freezing for the meat trade presents a special problem in that fowl meat, unlike beef and other animal meat, is extremely sensitive to freezer burn and to bruising. Freezer burn may be defined as a scar resulting from the excessive desiccation of the fowl meat by the loss of moisture during freezing in cold storage. Freezer burns render the meat unsightly and thus impair its salability, and the loss of moisture detracts from the flavor and taste of the fowl.

Attempts have been made heretofore to avoid freezer burn by enclosing fowl carcasses in moistureproof sheet materials such, for example, as waxed paper and sheets of regenerated cellulose coated with a moistureproof composition. Such attempts have not been satisfactory because, during storage or after thawing, moisture is always lost from the fowl carcass and this moisture, being unable to escape from the package, condenses on the inner surface of the wrapper and clouds the wrapper and makes the surface of the meat wet, thus promoting decay. The wrapping of fowl carcasses in sheet materials has further proved unsatisfactory because such sheet materials cannot be caused to tightly enclose and conform to the shape of a fowl carcass which has a very irregular shape. Moreover, regenerated cellulose films have the further disadvantage that shrinkage during storage sets up strains sufficient to cause the film to break, thus exposing the meat and producing an unsightly product.

The present invention has for its general object to avoid the disadvantages of prior attempts to preserve fowl carcasses and to provide a process for preserving fowl carcasses so as to form a neat and attractive package which will effectively protect and preserve the carcasses.

A more specific object of the present invention is to provide a fowl package which will withstand handling and freezing without the development of bruises and freezer burns.

Another specific object of the invention is to provide a fowl package which will preserve the fowl carcass without frosting during storage and after thawing.

Other objects of the invention will in part be obvious and will in part appear hereinafter.

According to the present invention, fowl carcasses are enclosed in a shrinkable seamless tubing formed of incompletely denitrated nitrocellulose and shrinking the tubing on the carcass, after which it may be subjected to cold storage or frozen while in the tubing. More particularly, the process comprises expanding a shrinkable tubing formed of denitrated nitrocellulose, stuffing an eviscerated fowl carcass in the tubing while expanded, closing the open ends of the tubing tightly against the carcass, shrinking the tubing thereon, and freezing the carcass in the tubing.

The invention accordingly comprises the several steps and relation of one or more of such steps with respect to each of the others, and the article possessing the features, properties, and the relation of elements, which are exemplified in the following detailed disclosure, and the scope of the invention will be indicated in the claims.

For more complete understanding of the nature and objects of the invention, reference should be had to the following detailed description, taken in connection with the accompanying drawing, in which.

Figure 1:
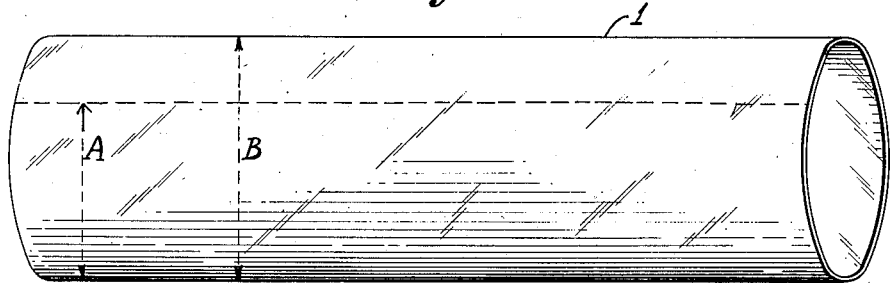
Fig. 1 represents a view of one embodiment of the tubing utilized in the process of the invention.
Figure 2:
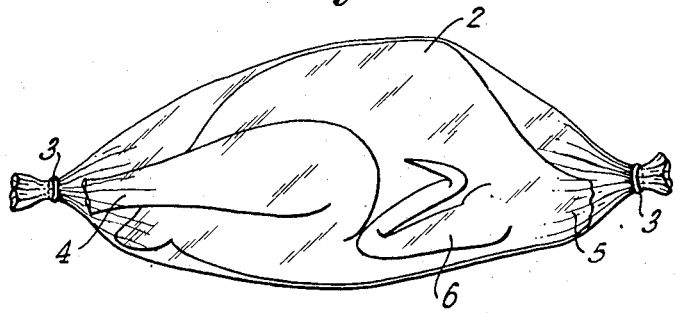
Fig. 2 represents a general view of the tubing containing a fowl carcass after stuffing, but before shrinking and freezing.

The present invention is applicable for the preserving and packaging of various types of fowl carcasses, such as squabs, chickens, ducks and turkeys. The fowl carcass is prepared for utilization in the present process in any suitable manner as by removal of the feathers, eviscerating, washing, singeing and the like in a known manner.

The tubing employed in the invention is characterized by being derived from the denitration of nitrocellulose, it having been found that this material is particularly adapted for tubing, producing novel results not obtainable with tubing made solely of regenerated cellulose or other cellulose derivatives.

The tubing may be produced by extrusion of a suitable nitrocellulose composition through an annular orifice followed by coagulation, denitration and drying in a known manner. The tubing may be cut from a long tubing and hence open at both ends or it may be formed initially as by moulding so as to have one closed end. The present invention employs a nitrocellulose tubing which has been denitrated superficially, partially, but not completely, and preferably so as to give a product having a nitrogen content lying between 0.5% and 2% by weight, and having substantially uniformly longitudinal and transverse tensile strength and capable of stretching transversely at least 30% and preferably 50% to 100% of the initial diameter.

In carrying out the present process the fowl carcasses are classified generally according to size and there is preferably selected for each general size of carcass a tubing having a diameter less than the diameter of the carcass. Preparatory to stuffing, the tubing is softened and expanded. For the softening agent there may be employed water or aqueous solutions of solvents or swelling agents for denitrated nitrocellulose, such for example as ethyl alcohol, glycerol, acetone, and the like. Preferably the tubing is subjected to the swelling agent until it is in the gel state which toughens it and renders it uniformly plastic and capable of stretching uniformly in all directions. The tubing is then expanded by forcing it over an expansible mandrel, after which it is stripped from the mandrel and inserted over the stuffing horn, or by the use of a divided or expansible stuffing horn which will positively expand the tubing transversely until it is sufficiently large to take the selected fowl carcass.

The packaging of the fowl carcass in the tubing may be carried out in a known manner. For example, a surface dry fowl carcass may be forced under suitable pressure through a stuffing horn into a dry tubing which has been shirred on the horn, or preferably a tubing is wet with water, expanded and stuffed while it is in a wet gel state. The expression "gel state" as used herein designates a tumefied tubing containing a swelling agent in excess of the maximum which could be tolerated in the commercial dry product as marketed. When the tubing is employed in the wet gel state, the surface of the fowl carcass is preferably wet as with water to facilitate the stuffing. During the stuffing sufficient pressure may be applied to cause the carcass itself to expand the tubing to a slight extent and to make the tubing conform to the irregular cross section of the carcass. If desired, the carcass at the time of stuffing may be partly frozen, but the best results are obtained by stuffing it in a soft and unfrozen condition in a pre-expanded tubing.

After the stuffing of the carcass in the tubing, the ends of the tubing may be closed in a suitable manner as by tying them with a cord or stapling the ends, the ends being closed tightly against the carcass. If the tubing has been expanded longitudinally, it is preferable to close the ends at a short distance from the ends of the carcass because a pre-expanded casing will shrink to a greater extent than an unexpanded casing and if a small space is not allowed, the closure may be broken during the shrinking of the casing.

The encased fowl carcass is now subjected to cold storage, preferably to a freezing process for preserving the carcass. If desired, the carcass may be frozen by any known freezing process, either a wet method, such for example as subjecting it to a spray of cold liquid or immersion in cold brine, or by a dry method, such for example as subjecting the carcass to the action of an atmosphere which is cooled by evaporation of solid carbon dioxide or which is cooled by artificial refrigeration of any type. During the cold storage and freezing of the carcass, the tubing undergoes a substantial transverse and longitudinal shrinkage thereby subjecting the carcass to a substantial compacting tension and causing the tubing to conform substantially to the shape of the carcass.

By way of illustrating, but not by way of limiting the invention, reference should be had to the following specific example taken in connection with the accompanying drawing. Referring to Fig. 1 there is shown a seamless tubing 1 of denitrated nitrocellulose having an initial diameter indicated by the broken line A. The tubing is soaked in water for a half hour and placed over the small end of a hand stuffing horn of the divided type. The horn is then expanded, thereby expanding the tubing to the diameter indicated by the broken line B. A fresh eviscerated chicken 2, having a maximum diameter, which is equal to or slightly greater than the diameter B of the stretched tubing, is dipped into water, then forced through the large end of the stuffing horn and into the tubing. The tubing containing the chicken is now taken from the horn and the ends of the tubing closed by tying them with a cotton string 3 at a point about a half an inch beyond the extremities of the chicken carcass, the excess tubing extending beyond the tie being cut off at a suitable point.

Figure 3:
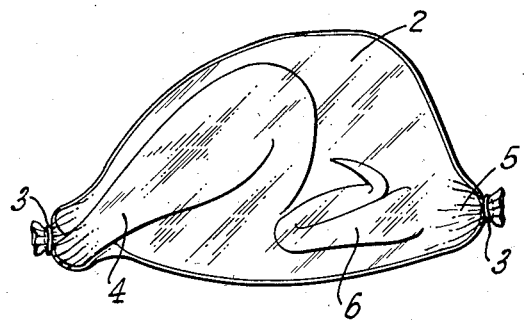
Fig. 3 represents one embodiment of the article of the invention.

The package thus produced is then placed in a cold brine bath and allowed to remain until the carcass is frozen. During the drying, the tubing contracts and subjects the carcass to a substantial compacting tension. The tension exercised by the shrinking tubing is sufficient to force inwardly and upwardly the extremities of the chicken. As shown in Fig. 3, the legs 4 are forced inwardly and upwardly against the chest, thus causing the carcass to look fatter and more rounded. The neck portion 5 and the wings 6 are also forced inward to enhance this effect so that a compact package is produced in which the tubing conforms substantially to the shape of the carcass.

The tubing of the invention may be decorated in any manner as by printing or dyeing and a label may be disposed between the carcass and the casing. In particular the tubing may be treated by coating and/or impregnating to combine it with a substance which retards the development of rancidity.

The preserved frozen package of the invention is characterized by the following features and advantages. The tubing has a permeability to water vapor which is less than that of a sheet of regenerated cellulose so that the desiccation and drying out of the meat proceeds at a lower rate than that of a sealed wrapper of sheet regenerated cellulose, thus avoiding production during cold storage of freezer burns. However, the denitrated nitrocellulose tubing has a moisture permeability which is greater than that of undenitrated nitrocellulose or of moistureproofed regenerated cellulose. Thus when the package is placed in a showcase where the temperature is above freezing, the moisture will slowly pass through the denitrated nitrocellulose tubing, thus avoiding the clouding of the inside of the tubing which occurs when fowl carcasses are encased in moistureproof sheet materials, such as waxed paper, moistureproof Cellophane and the like. Moreover, the carcass encased in denitrated nitrocellulose tubing can be subjected to a substantial amount of rough handling without deformation of the carcass and the production of bruise spots because the carcass is under compacting tension in the package. The present tubing resists bruising under the conditions of freezing, storage and handling which will cause sheets of regenerated cellulose to be ruptured. Finally, denitrated nitrocellulose tubing is resistant to cold brine of a temperature and concentration which embrittles regenerated cellulose thus enabling the carcasses to be frozen by the economical brine process.

In the appended claims the expression "expanding the tubing" is intended to include expansion of the tubing during its manufacture or preparatory to stuffing the fowl therein, and the expression "pre-expanded" indicates a product of either of such processes.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

I claim:

1. In a process for preserving a fowl carcass, the steps comprising, softening a seamless tubing formed of denitrated nitrocellulose and open at both ends, expanding the softened tubing transversely, wetting the surface of a fowl carcass, inserting the wet carcass into the tubing while the tubing is in a soft and expanded condition, closing the open ends of the tubing, shrinking the tubing on said carcass, and freezing the carcass in said tubing.

2. In a process for preserving a fowl carcass, the steps comprising, expanding a seamless tubing formed of denitrated nitrocellulose, enclosing a fowl carcass in said tubing while expanded, shrinking the tubing on the carcass and into substantial conformation with the shape thereof, and freezing the carcass in said tubing.

3. In a process for preserving a fowl carcass, the steps comprising, shrinking about a fowl carcass a seamless tubing formed of denitrated nitrocellulose and subjecting the carcass to cold storage while in said tubing.

4. In a process for producing a marketable package, the steps comprising, enclosing a fowl carcass in a shrinkable tubing formed of denitrated nitrocellulose and shrinking the tubing on the carcass and into substantial conformation with the shape thereof.

5. As an article of manufacture, a marketable package comprising a frozen fowl carcass enclosed in a shrinkable denitrated nitrocellulose tubing comprising from about 0.5% to 2% by weight of nitrogen, the tubing conforming to the general shape of the carcass and exerting a compacting tension thereon.

6. As an article of manufacture, a marketable package comprising a frozen fowl carcass tightly enclosed in a seamless tubing formed of partially denitrated nitrocellulose, said tubing exerting a compacting tension on said carcass which shapes the same.

HARRY R. McCLEARY.